March 23, 1971 H. L. SHATTO, JR., ET AL 3,572,139

LOAD OPPOSITE RESONANT SYSTEMS

Filed March 27, 1969 7 Sheets-Sheet 1

INVENTORS:
H. L. SHATTO
P. V. H. SERRELL
BY: Fielding E. Baker
THEIR ATTORNEY

LOAD OPPOSITE RESONANT SYSTEMS

Filed March 27, 1969 7 Sheets-Sheet 2

INVENTORS:
H. L. SHATTO
P.V.H. SERRELL

BY: Fulling E Baker

THEIR ATTORNEY

INVENTORS:
H. L. SHATTO
P. V. H. SERRELL
BY: Freling E Baker
THEIR ATTORNEY

March 23, 1971 H. L. SHATTO, JR., ET AL 3,572,139

LOAD OPPOSITE RESONANT SYSTEMS

Filed March 27, 1969 7 Sheets-Sheet 4

INVENTORS:
H. L. SHATTO
P. V. H. SERRELL
BY: [signature]
THEIR ATTORNEY

INVENTORS:
H. L. SHATTO
P.V.H. SERRELL
BY: [signature]
THEIR ATTORNEY

INVENTORS:
H. L. SHATTO
P. V. H. SERRELL
BY: Irving E. Baker
THEIR ATTORNEY

INVENTORS:
H.L. SHATTO
P.V.H. SERRELL
BY: Freling E Baker
THEIR ATTORNEY

United States Patent Office 3,572,139

Patented Mar. 23, 1971

3,572,139

LOAD OPPOSITE RESONANT SYSTEMS

Howard L. Shatto, Jr., 5890 La Jolla Corona Drive, La Jolla, Calif. 92037, and Peter V. H. Serrell, 344 S. Granados, Solana Beach, Calif. 92075

Continuation-in-part of application Ser. No. 795,643, Jan. 31, 1969. This application Mar. 27, 1969, Ser. No. 813,803

Int. Cl. B06b *3/00;* F16h *33/20*

U.S. Cl. 74—87 9 Claims

ABSTRACT OF THE DISCLOSURE

A "load opposite" resonant system is provided with selected mass and spring compliance, an oscillator having an appropriate frequency and power output, and an engine with corresponding frequency and power output such that the operating frequency range of the system is in the region of, and predominately within the range and influence of its locked-load resonant frequency.

CROSS REFERENCE TO RELATED APPLICATIONS

The present invention is a continuation-in-part of my copending application Ser. No. 795,643, filed Jan. 31, 1969, now abandoned.

BACKGROUND OF THE INVENTION

The present invention is directed to resonant vibratory work-performing systems and pertains more particularly to "load opposite" resonant systems.

Many useful industrial applications of high power sonic energy have been recently discovered. These applications include, for example, drilling, pile driving, rock cutting, and rock crushing. Such applications of sonic energy are generally carried out by employing a resonant vibratory system comprising a sonic oscillator coupled by means of an elastic member to a work member. Such systems are generally designed to operate within the undamped resonant frequency range of the system just below the peak resonant frequency curve. These systems are capable of multiplying the force output of the oscillator many times and applying this force to a tool or workpiece.

The above-described systems are satisfactory for many applications. However, they have a number of disadvantages and are not satisfactory for applications where the load on the system is subjected to sudden changes or where it is desirable to operate the system over a very wide range of load conditions and where the prime mover has the usual speed droop with load and where it is not desirable to install elaborate controls to prevent overexcursion. For example, since such systems are operated close to the undamped resonance frequency of the system, they are very sensitive to slight increases in speed and since a loss in load results in an increase in speed and the system operates nearer undamped resonance, the stroke can become excessively large and the system can destroy itself. Moreover, such systems are unable to maintain the work stroke constant over a significant range of load conditions. These systems are also unable to operate at maximum available horsepower over a significant range of damping.

SUMMARY OF THE INVENTION

Accordingly, it is the primary object of the present invention to provide a resonant system that is in many ways automatically self-regulating. It is another object of the present invention to provide a resonant system capable of delivering constant horsepower to a work member over a wide range of load conditions.

Another object of the present invention is to provide a resonant system that automatically de-tunes itself upon removal of load.

A further object of the present invention is to provide a resonant system that is capable of maintaining a constant stroke of the work member over a wide range of load conditions.

A still further object of this invention is to provide a resonant system capable of maintaining essentially constant stroke of the work member as damping is increased up to the limit of power available from a prime mover and maintaining essentially constant power above that value of damping.

A still further object of the present invention is to provide a resonant system that is capable of delivering a constant force output over a wide range of load conditions.

A still further object of the present invention is to provide a system in which stress is independent of load.

In accordance with the present invention, a load-opposite resonant vibratory system is constructed with spring and mass means of the system matched so that the operating frequency is a function of the locked-load resonant frequency of the system, and provided with an oscillator and a prime mover to meet the power and frequency requirements of the system for operating at said operating frequency under the influence of the locked load resonant frequency of the system.

BRIEF DESCRIPTION OF THE DRAWINGS

The above and other objects and advantages of the present invention will become apparent from the following description when read in conjunction with the accompanying drawings in which.

The term "load opposite" has been coined to differentiate between the system described and systems in which the oscillator is attached adjacent to or on the same side of the node as the system load. The latter systems, called "load adjacent" is not covered in detail here. But it should be noted that in contrast to the load opposite system, the load adjacent system is limited in the force it can apply to the load as damping is increased to high values. It can be seen in the load adjacent system that as damping inhibits load displacement it also inhibits oscillator displacement as well as the stored energy and Q of the system. Even without damping, at peak resonance the oscillator force is opposed by the resonant force of the spring mass combination and the load stroke is zero. Such systems tend to be suited only for light loads. They also tend to require close operator control of the resonant response since they are not as amenable to self control.

What is called here the load opposite system might also be called a resonant oscillator system or a pilot oscillator system. In the case of the lumped mass and spring system shown in FIG. 1, the combination of the oscillator and upper weight or bob weight and the connecting spring can be thought of as a resonant oscillator which drives the impedance of the load. The load impedance can be made up of the damping of the load plus the reactance of any attached mass or spring. If the load impedance is high, the force applied to it can be much higher than that available from the eccentric weight alone. This is made possible by the force multiplication capability of a high Q resonant system.

A resonant system with its load on the opposite side of a node from the oscillator is found to have many possible variations in its geometry and in all of these forms it can be by judicious adjustment of the parameters made to exhibit some very unusual and useful characteristics including force multiplication resulting from improved impedance matching between load and oscillator. Among the most useful characteristics obtainable are those seen when the system is operated near the locked load resonant frequency. This is frequently in the range of ⅔ to ¾ of the frequency of the normally used lightly damped resonant frequency.

Figure 1:
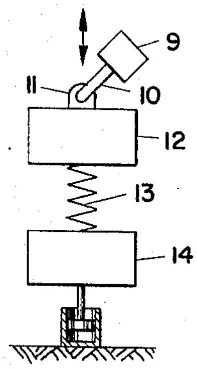
FIG. 1 is a schematic illustration of a resonant system arranged in accordance with the present invention.

Referring now to FIG. 1, there is illustrated a load opposite system in its simplest form which consists of an eccentric weight oscillator 11 mounted on a mass 12, sometimes referred to as the bob weight. This mass 12 is connected through a spring 13 to a second mass 14 which represents the mass of the load and which drives the damping load 15, schematically shown here, to be a viscous damper.

Figure 2:
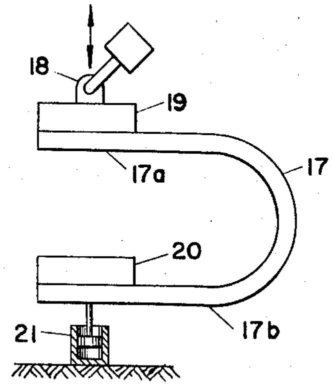
FIG. 2 is a schematic illustration of one form of a system embodying the present invention.

Some of the many other forms of the load opposite system are also shown in FIGS. 2–6. For example, in FIG. 2 is schematically illustrated a tuning fork arrangement in which the spring of the system is provided by an elastic beam 17 which is bent into a U or V shape so as to respond like a tuning fork. An oscillator 18 is coupled to one leg **17*a* and the load or working tool is coupled to the other leg 17*b*. A first mass 19 represents the non-eccentric mass of oscillator 18 and this along with a portion of the distributed mass of upper leg 17*a* serves as a bob weight. A second mass 20 represents the mass of the load along with a portion of leg 17*b*. A damping load 21, represented schematically by a dashpot is coupled to the lower leg 17*b***.

Figure 3:
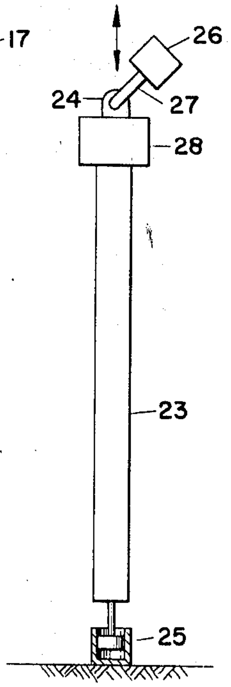
FIG. 3 is a schematic illustration of a second form of systems embodying the present invention.

In FIG. 3 is illustrated a longitudinal beam type system in which the spring and much of the mass of the system are found distributed through a longitudinal elastic beam 23 coupling an oscillator 24 to a damping load 25. The oscillator 24 includes an eccentric mass 26 mounted on a rotating arm 27. The mass of the oscillator housing 24 is represented by mass 28. In the longitudinal beam, locked load resonance corresponds to a quarter wave response and undamped resonance produces the half wave response.

Figure 4:
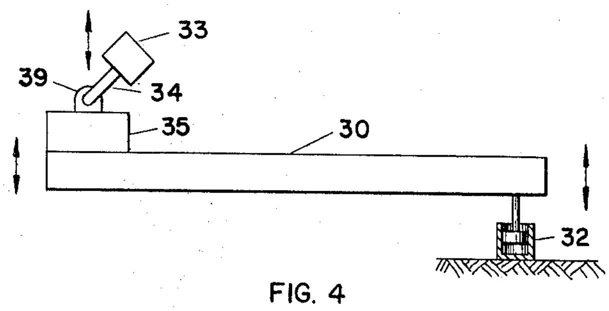
FIG. 4 is a schematic illustration of a third form of systems embodying the present invention.

A lateral beam resonant system is illustrated in FIG. 4, in which a lateral beam 30 serves as the distributed spring and mass of the system to couple an oscillator 31 to a damping load 32. The oscillator 31 is represented as having an eccentric mass 33 carried on a rotating arm 34 and having a housing mass 35.

Figure 5:
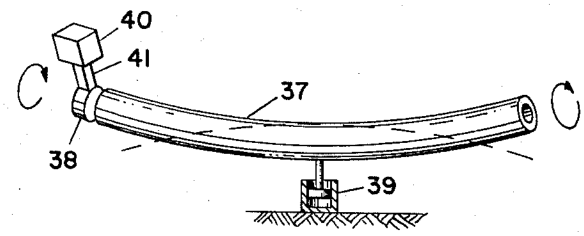
FIG. 5 is a schematic illustration of a fourth form of systems embodying the present invention.

A gyratory bar system is illustrated in FIG. 5 in which an elastic tube or bar 37 is mounted for gyratory elastic vibration and serves as a distributed spring and mass between an oscillator 38 and a damping load 39 on the system. The oscillator 38 is illustrated as having an eccentric mass 40 carried on an arm 41 which rotates about an axis substantially parallel to the axis of elastic bar 37.

Figure 6:
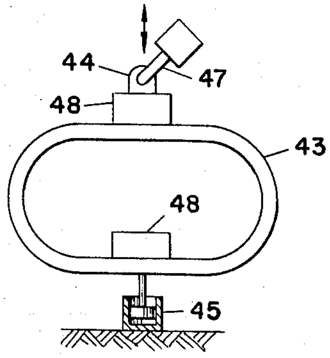
FIG. 6 is a schematic illustration of a fifth form of systems embodying the present invention.

The system illustrated in FIG. 6 may be referred to as a ring system or a double tuning fork system. In this arrangement a substantially ring shaped elastic bar 43 serves as the spring member between an oscillator 44 and a damping load 45. The oscillator 44 comprises an eccentric mass 46 carried on a rotating arm 47. Load mass is represented by block 48 and bob weight by block 49.

As taught herein, by judicious adjustment of system parameters, such as mass and spring, any one of a number of favorable characteristics can be obtained to meet the demands required of the system. For example, one very useful characteristic of a load opposite system constructed and operated in accordance with the present invention is its capability of providing high force multiplication at high damping in the region of "locked-load resonance," as well as high force multiplication at low damping in the more familiar region of undamped resonance.

A second useful characteristic of a system of the present invention to find application is that of de-tuning from resonance upon loss of load, or conversely, tuning to resonant response upon application of load. If the engine is governed to a frequency in the vicinity of locked load resonance, the system is excited to resonant response only when load is applied to the output member of the system. If the load is then removed, but the speed held constant, the system shows a reduction in resonant response. The prime mover is then unloaded and both the excursions and stresses of the resonant bar remain moderate.

A third useful characteristic formed the basis for an air-spring resonant cable plow (FIGS. 14, 15) when it was discovered that the system could be designed with the proper combination of elements to produce very broad range torque converter characteristics. Even though the damping load seen by the plow blade varies naturally over a wide range from one soil condition to another, the system can be designed to permit an engine driver or prime mover to run at nearly constant, full speed and to deliver its full available power over a range of as much as one thousand to one change in load damping. As damping is added, the system responds to increase blade force to oppose a decrease in blade stroke to hold horsepower and engine speed essentially constant. This is closely analogous to the application of a torque converter to an engine; however, a torque converter is limited to a range of three or four to one on load change and at best is less than 85% efficient.

Figures 12, 13:
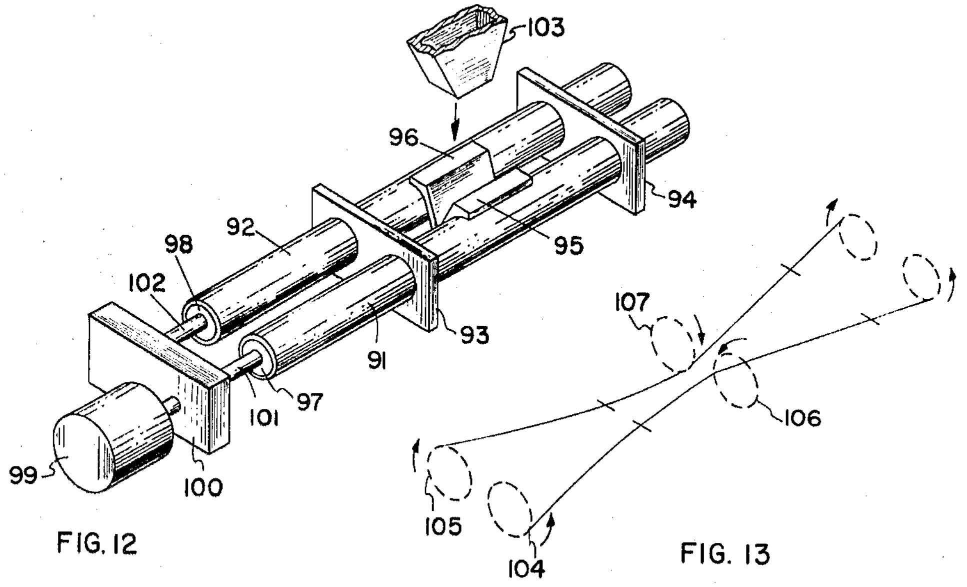
FIG. 12 is an isometric view of first preferred embodiment of the present invention.
FIG. 13 is a motion diagram for the apparatus of FIG. 12.

A fourth characteristic is that of the system to hold a constant stroke at the load regardless of the damping applied to the load, provided speed is well controlled and ample power is available. This characteristic is being used to hold a fixed rock crusher jaw orbit in the face of changing loads (FIGS. 12, 13). In this type of crushing the damping load imposed is variable from full to zero and is applied in only the horizontal component of the jaw orbit. The vertical component is essentially undamped. However, when both components are operated at the locked load resonant frequency, the jaw orbit shape and size remains constant in spite of changes in crusher load.

A fifth characteristic is the ability of the system when constructed for operation at a particular frequency to produce a constant force amplitude on the load regardless of the damping of the load. If the load consists of damping only, then the constant load force will occur at the undamped resonant frequency. If the load has mass as well as damping, the frequency at which load force is independent of damping will be lower than undamped resonance. Another aspect of this feature is that in distributed mass systems the maximum stress in the elastic resonant member can be made to be constant regardless of the damping imposed by operating at the frequency which is approximately the root mean square of the locked load and undamped resonant frequencies for the system. This aspect permits desiging a resonant member to its maximum permissible stress and insuring that it will operate there regardless of load so long as the design speed is held. This permits maximum efficient use of the resonant member; that is, the development of the maximum Q per unit weight of the resonant member regardless of the load imposed without any risk of overstressing the system under changing loads.

Figures 7, 8:
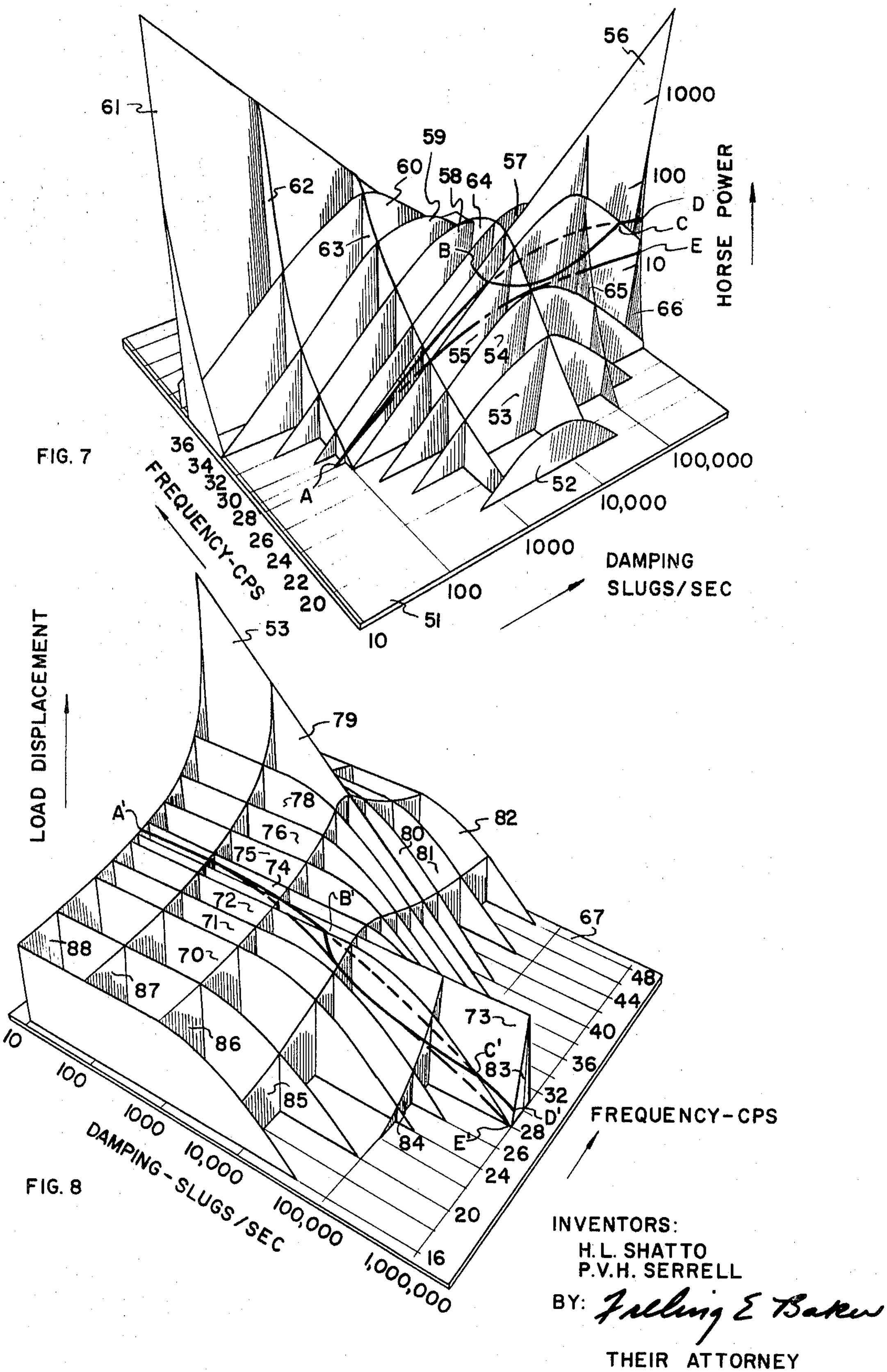
FIG. 7 is a three dimensional diagram of the relationship between important parameters of a system of the present invention.
FIG. 8 is a three dimensional diagram of the relationship between other important parameters of a system of the present invention.

The useful characteristics described above for the load opposite system, can be obtained from any one of the systems shown in FIGS. 1–7 provided a proper relationship is maintained between the parameters of the system. However, the lumped spring-mass system, FIGS. 1 and 7, is easiest to analyze. Some aspects of the behavior of the system are obvious from inspection. For example, the downward shift in resonant frequency with added damping can be deduced readily. If the damping is zero and the upper and lower masses 12 and 14 are about the same value the nodal area at resonance is in the center of the spring. The resonant frequency is then determined by the bob weight and eccentric mass 9 bouncing one one-half of the spring 13 as if the spring were embedded in a wall at its mid-point.

On the other extreme, if the damping were infinite, then the lower mass 14 could not move at all and the resonant frequency would be determined by the bob weight 12 and eccentric mass 9 bouncing on the full length of the spring 13. With one-half the previous spring stiffness the infinitely damped or locked load resonant frequency will be ½ or .707 times the undamped resonant frequency. At both the undamped and locked load resonant frequencies the bob weight amplitude, the spring force applied to the load the system Q are all infinite since no work is done at the load. At intermediate finite values of damping, resonance is found at intermediate frequencies and the bob weight stroke, force and system Q are held to finite values.

If the oscillator 11 is driven at the lower frequency corresponding to locked load resonance the bob weight 12 shows little resonant response without damping, but as damping is applied, the system resonant frequency is lowered and the system is operating closer to peak resonance, and the bob weight stroke increases. As it does so, the excursion of the string and therefore the force applied to the load is also increased. The system is therefore one which meets added load with added force so long as ample power is available. In fact, the load displacement at locked load resonance is constant regardless of the damping of the load.

If unlimited power is not available and the limit is reached and the prime mover then shows a pronounced speed droop with load, then the steep slope and broad face of the power demand characteristic at locked load resonance provide the basis for an unusually broad range torque converter characteristic. An engine for instance can apply whatever torque it has available, and if the resonant speed is set to match full engine speed, then the engine can deliver its maximum horsepower over a very wide range of damping conditions.

Referring particularly to FIG. 7 there is illustrated a three-dimensional model representing the horsepower response of the system to various combinations of frequency and damping. The model comprises a base grid 51 marked off into linear divisions of frequency from the front towards the left background and into values of damping on a log scale from the left to the right. Extending vertically from the base 51 at designated values of frequencies are a plurality of planar elements 52 thru 61 the upper edge of which is a curve on a log scale representing values of horsepower plotted against damping at the selected frequencies. Also extending vertically from grid plate 51 and at 90° from the above mentioned elements are a second series of planar elements 62 through 66 the upper edges of which represent values of horsepower versus frequency at the designated values of damping. The most noteable planar elements illustrated are 56 which represents the locked load resonant frequency of the system, and planar element 61 which represents the undamped resonant frequency of this system. The most dramatic feature of these curves 56 and 61 is that they slope in different directions and the slope remains substantially constant. For example, at the undamped resonant frequency of the system the horsepower of the system goes down as the load goes up. Whereas at the locked load resonant frequency of the system the horsepower of the system goes up as the load and damping goes up. The significance of these two features will become apparent later. Another point of significance is that when operating frequency falls between the locked load resonant frequency and the undamped resonant frequency the full load power of the prime mover must be less than the peak power demanded by the system at the transition point. The transition point corresponds to the value of damping equal to $\omega_C=\infty\ (M_R+M_B+M_L)$, the value of horsepower equals the maximum at this value of damping, and the frequency at which the said power peaks.

Referring now to FIG. 8 there is illustrated a three-dimensional model representing the responses of load stroke or displacement to various combinations of frequency and damping for the same system represented by FIG. 7. The model of FIG. 8 comprises a base grid 67 representing load as damping in slugs per second on a log scale from left background to right foreground and representing frequency in cycles per second on a linear scale from the front to the right background. A plurality of planar elements 68 to 82 extend upward from base grid 67 at designated frequencies. The upper or top edge of these planar elements represent various values of load stroke on a log scale for the various values of load damping for the designated frequencies. A second set of planar elements 83 thru 88 are positioned at right angles to the above mentioned planar elements and extend up from base grid 67 at the designated values of load damping. The upper edge of each of these planar elements represent load stroke of the system on a log scale at various frequencies at the designated damping load. The most notable planar elements of this model are elements 73 and 79 which represent locked load resonant frequency and undamped resonant frequency of the system. The upper edge of element 73 dramatically illustrates that at locked-load resonant frequency, the load stroke of the system remains constant regardless of the damping load on the system.

The most commonly constructed resonant systems operate generally in the range of just under the natural resonant frequency or unloaded resonant frequency of the system. Such operation gives it tremendous magnification of force and power input. This makes such systems ideally suited for situations where damping loads are relatively small and remain fairly constant. Referring to FIG. 7 such operation would generally be somewhere within the range between planes 59 and 61. This operation represented on FIG. 8 would be somewhere in the vicinity of plane 76 and 79. Such systems, however, are unsuited for conditions where the load or damping varies considerably over a very wide range and reaches very high values and or in an area or under conditions where it is desirable to maintain a constant load stroke and avoid excessive excursion upon loss of load. Thus, from the above illustration, it is clear that for some load conditions it is desirable to have a system that is constructed to operate within the vicinity of the locked load resonance of the system. Thus, referring to FIG. 7, a desirable system may be constructed and arranged to operate in a range along line A, B, C, in FIG. 7, corresponding to $A^1$, $B^1$ and $C^1$ in FIG. 8. The line through line A, B and C is determined by the engine or prime mover of this system and how it is governed. The surface formed by the upper edges of the response curves represents the response of the resonant system determined by the oscillator mass and eccentricity and the masses and springs in the resonant system, in the relationships pointed out later. The damping seen at the load and the operating speed determine the point on the surface at which the system will operate at any given moment.

This process can be understood best by reference to the three dimensional models illustrated in FIGS. 7 and 8. In the case shown, an internal combustion engine is governed to a no-load speed of 29 c.p.s. shown at (or below) point A. Since a conventional proportional governor has a speed regulation of about 3%, the speed will decrease to about 28 c.p.s. at full load. In the case shown, the engine has a capacity of 50 horsepower and the governor will have advanced the throttle to its stop at point B. Any further increase in damping must then be met by a corresponding decrease in speed since the engine cannot increase its power output. The minimum speed of just over 26 c.p.s. in this example occurs at a damping of about 15,000 slugs per second. As damping is further increased the speed is restored until again at 28 c.p.s. at point C the htrottle its sop and he governor again becomes active reducing fuel and engine power as the speed increases slightly above 28 c.p.s. to the highest damping shown. The horsepower demanded of the engine was thus held nearly constant from point B to point C, a range of damping of more than 70 to 1. A drop of speed of less than 7% can usually be made with less than proportional loss in power since the torque available from an engine usually increases with a drop in speed. Even at damping values beyond point C the power is reduced only slowly.

The method shown is particularly effective since it makes use of the intersection of the approximately vertical plane A, B, C of an engine governor with the essentially horizontal plane of constant power B, C seen over a narrow range of speed with the throttle against its stop.

A very similar, although not as strikingly flat topped, curve (broken line A to E, FIG. 7) can be made with any slightly higher powered prime mover governed, below throttle stop, with a medium speed droop of say 10% from no load to full load. A prime mover with tighter speed control could be made to follow line A to B and the dotted line from B to C in FIG. 7. This includes induction motors, one of the most popular power sources.

It is a curious fact, as illustrated in FIG. 8, that the load displacement amplitude is constant regardless of the load damping imposed on a load opposite system driven at its locked load resonant frequency. This leads one obviously to question what then does determine the constant value of the load displaement in such a system, This and other relationships useful in the design and construction of novel resonant systems are derived here using a simple electrical analog.

Figure 9:
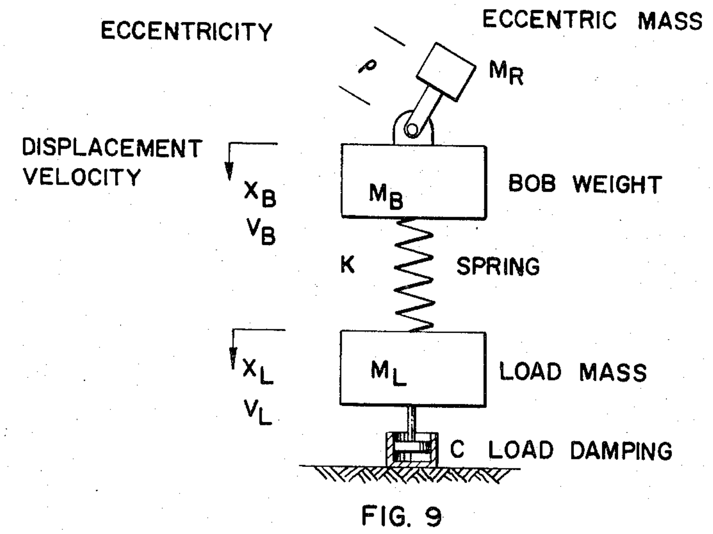
FIG. 9 is a schematic illustration of the arrangement of FIG. 1 with labels added.
Figure 10:
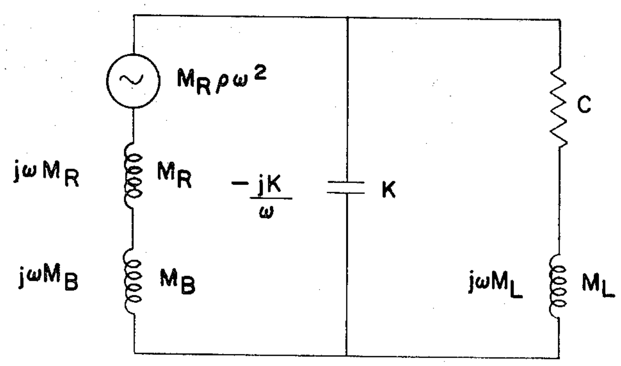
FIG. 10 is a schematic illustration of the electrical equivalent of FIG. 9.
Figure 11:
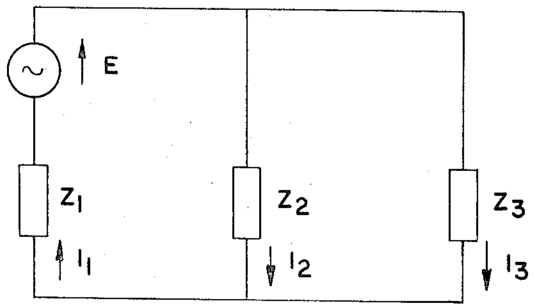
FIG. 11 is a simplified circuit equivalent to FIG. 10.

The mechanical schematic and its electrical analog are shown in FIGS. 9–11. The analog chosen here is perhaps the most direct and easily understood. Voltage is equivalent to force, and current to velocity. The impedance components caused by inductance, capacitance and resistance have their counterparts in mass, spring and viscous damping (see Table 1). The mechanical impedances are shown opposite each of the elements in the circuit diagram. The oscillator force $M_R\rho\omega^2$ is the force generated if no motion is permitted of the housing, which corresponds to the open circuit potential of an electromotive force (generator or battery). The internal impedance of the source, in this case the mass impedance of the rotor $j\omega M_R$, is treated simply as an additional external impedance as would normally be done in an electrical circuit. Inclusion of the rotor impedance is important to the analysis, and it is not normally accounted for in the literature on mechanical systems.

TABLE I

| Mechanical | | Electrical | |
|---|---|---|---|
| Damping coefficient | C | R | Resistance. |
| Mass | M | L | Inductance. |
| Mass reactance | $j\omega M$ | $J\omega L$ | Inductive reactance. |
| Spring compliance | $\frac{1}{K}$ | C | Capacitance. |
| Spring reactance | $-j\frac{K}{\omega}$ | $\frac{-j}{\omega C}$ | Capacitance. |
| Force | $M_R\rho\omega^2$ | E | Potential. |
| Velocity | V | I | Current. |

The impedance for each leg of the circuti is as follows designated by the letter Z with a subscript $$Z_1=j\omega M_R+j\omega M_B=j\omega(M_R+M_B) \quad (1)$$

$$Z_2=-j\frac{K}{\omega} \quad (2)$$

$$Z_3=C+j\omega M_L \quad (3)$$

Where:

The mass, velocity, etc., of the bob weight are designated by the subscript B;

The mass, velocity, etc., of the load are designated by the subscript L;

The mass, etc., of the oscillator rotor are designated by the subscript R;

The eccentricity of the oscillator rotor is designated by the symbol $\rho$ and

The angular velocity of the oscillator rotor is designated by the symbol $\omega$.

Other elements can be included or deleted here as desired. For example, if there is significant spring reactance in the load, it can be added to the damping and mass reactance already shown in $Z_3$.

The equations for the system can be written by inspection from the simplified electrical analog in FIG. 11.

$$I_1=I_2+I_3 \quad (4)$$

(Kirchhoffs' first law—the sum of currents into a junction is zero), and $$E-I_1Z_1=I_2Z_2=I_3Z_3 \quad (5)$$

(Kirchhoffs' second law—the sum of potentials around any loop is zero.)

Solving (4) and (5) simultaneously gives:

$$I_3=\frac{EZ_2}{Z_1Z_2+Z_2Z_3+Z_1Z_3} \quad (6)$$

Alternatively, the impedance may be added in series and parallel and applied to Ohm's law for solution.

Equation 6 gives the expression for velocity of the load upon substitution of Equations 1, 2 and 3 and oscillator force for source potential and simplifying.

$$V_L=\frac{M_R\rho\omega K(-j)}{K(M_R+M_B+M_L)-\omega^2M_L(M_R+M_B)+C\left[j\omega(M_R+M_B)-j\frac{K}{\omega}\right]} \quad (7)$$

While this expression is complex in more than one way, it is far simpler at locked load resonance. At the locked load resonant frequency $$Z_1+Z_2=0$$

Substituting in Equation 6

$$I_3=\frac{-EZ_1}{-Z_1^2-Z_1Z_3+Z_1Z_3}=\frac{E}{Z_1} \qquad (8)$$

or $$=\frac{-E}{Z_2} \qquad (9)$$

Since all terms which include load impedance cancel, it is clear that *no* element of load impedance i.e., spring or mass, as well as damping will have any effect on load velocity or displacement amplitude at the frequency of locked load resonance. It is determined only by the oscillator force and the value of either the total bob weight or resonant spring stiffness.

Converting Equation 8 to mechanical terms gives:

$$V_L=\frac{M_R\rho\omega^2}{j\omega(M_R+M_B)}$$

$$V_L=\frac{-jM_R\rho\omega}{(M_R+M_B)} \qquad (10)$$

and load displacement is $$X_L=\frac{-M_R\rho}{M_R+M_B} \qquad (11)$$

Thus at locked load resonance the load displacement amplitude is dependent in this expression, only upon the mass of the rotor 9 and of the bob weight 12 and the oscillator eccentricity (length of arm 10). It is interesting that this is the same expression as that for the displacement amplitude of the driven mass in a simple mass-ratio system, for all frequencies rather than the specific one tn this case and provided only that the damping is zero as opposed to the complete independence of damping in this case.

Using the alternative expression in Equation 9 for substitution gives:

$$V_L=\frac{-M_R\rho\omega^2}{-j\frac{K}{\omega}}$$

$$V_L=\frac{-jM_R\rho\omega^3}{K} \qquad (12)$$

and load displacement at locked load resonant frequency is $$X_L=\frac{-M_R\rho\omega^2}{K} \qquad (13)$$

Here the load displacement is alternatively found to be a direct function of oscillator force and inversely proportional to the spring stiffness. The sign and imaginary operator *j* indicate that the load velocity lags the oscillator force by 90° and that the load displacement is 180° opposed to the oscillator force.

It is clear from this that operation well down into the locked load resonant regime should be undertaken only with a good understanding of the fundamentals of such operation. An oscillator force and resonant spring constant designed for operation high on the undamped resonance response, i.e., between 60 and 61 in FIG. 7, will produce very weak performance at the locked load resonant frequency. At the lower frequency the oscillator will produce much less force than it would at undamped resonance. To produce a given load displacement the oscillator force generally must be increased rather than decreased when going to locked load resonance.

Although the load stroke is theoretically constant all the way to infinite damping at locked load resonance, it can be seen from the computer plots, FIGS. 7 and 8, that substantially constant stroke can be achieved even at frequencies well above and below locked load resonance provided the damping is held to small values compared with the mass reactances in the system. The range of damping over which load stroke is constant falls off rapidly as operating frequency is varied either side of locked load resonant frequency. But, although essentially constant stroke can be obtained over a narrow range of damping even near undamped resonance and operation there does reduce the oscillator force requirement, it also makes the system much more subject to overexcursion if removal of damping causes a slight increase in speed.

The frequency at which locked load resonance occurs can be derived from the fact that at that resonance $$Z_1+Z_2=0$$

Converting to mechanical terms $$j\omega(M_R+M_B)-\frac{K}{\omega}=0$$

$$\omega^2(M_R+M_B)=K$$

$$\omega_C=\infty=\frac{K}{M_R+M_B} \qquad (14)$$

The resonant frequency at zero damping is also a useful expression and can be found by setting the denominator in Equation 7 equal to zero and noting that damping is also zero.

$$K(M_R+M_B+M_L)-\omega^2M_L(M_R+M_B)=0$$

$$\omega_{C=0}=\sqrt{\frac{K(M_R+M_B+M_L}{M_L(M_R+M_B)}} \qquad (15)$$

The ratio of locked load resonance to undamped resonance is also of interest:

$$\frac{\omega_{C=\infty}}{\omega_{C=0}}=\sqrt{\frac{M_L}{M_R+M_B+M_L}} \qquad (16)$$

and for example when $M_L=M_B+M_R$ $$\frac{\omega_{C=\infty}}{\omega_{C=0}}=\sqrt{\frac{1}{2}}=.707$$

(which confirms an earlier conclusion) when $$M_L=\frac{M_R+M_B}{3}$$

locked load resonance is found at 0.50 times the frequency of undamped resonance, and when $$M_L=3(M_R+M_B)$$

the ratio is .87.

Since it may also be of use, the equation for bob weight velocity is also derived.

Solving Equations 4 and 5 for $I_1$ gives:

$$I_1=\frac{E(Z_2+Z_3)}{Z_1Z_2+Z_2Z_3+Z_1Z_3} \qquad (17)$$

Substituting mechanical terms and simplifying gives:

$$V_B=\frac{M_R\rho\omega^2(C+j\omega M_L-j\frac{K}{\omega}}{K(M_R+M_B+M_L)-\omega^2(M_R+M_B)+C\left[j\omega(M_R+M_B)-j\frac{K}{\omega}\right]}$$

The forces found in various parts of the system can be found easily from the analog of voltage. The voltage across any element is equal to the impedance of the element or group of elements times the current through them. The force on the load damper would be simply $V_LC$ the total force on the load is the same as the force on the spring as seen in Equation 5. It would be $I_3Z_3$ or mechanically $V_L(C+jM_L)$. Substituting $V_L$ from Equation 7 and simplifying gives:

$$\text{Force}=\frac{j\omega M_R\rho(M_L-KC)}{K(M_R+M_B+M_L)-\omega^2M_L(M_R+M_B)+C\left[j\omega(M_R+M_B)-j\frac{K}{\omega}\right]}$$

Referring now to FIGS. 12 and 13, there is illustrated a preferred embodiment of the present invention in the form of a parallel bar rotary jaw resonant crusher. This apparatus comprises a pair of elastic bars 91 and 92 disposed adjacent and extending parallel to one another. These bars may be of any suitable construction such as, for example, tubular members of a good grade of steel. Suitable elastic support and tie means 93 and 94 engage elastic members 91 and 92 at nodal areas to support and maintain said members in their proper position. Suitable crushing jaw members 95 and 96 are mounted on and operatively coupled to elastic members 91 and 92 respectively. A pair of orbiting mass oscillators 97 and 98 are coupled respectively to elastic bars 91 and 92 such as by mounting in the end thereof as illustrated. A prime mover 99 properly selected in accordance with the previous discussion, is operatively coupled by means of suitable transmission means 100 and a pair of counter-rotating shafts. Suitable feeding means in the form of a chute or hopper 103 is provided for introducing or directing materials to be crushed between the jaws 95 and 96. The various elements, including springs and masses, of this system are selected and matched in accordance with the procedures set forth in the preceding paragraphs. This system then forms a "load-opposite" system as can be readily seen from the drawings because the load which will be engaged by the jaws 95 and 96 are on the opposite side of the nodal area engaged by support means 93 from the oscillators 97 and 98. In order that materials to be crushed such as rocks are reduced to a uniform size and to prevent clashing of the jaws upon loss of load it is desirable then that the movement of jaws 95 and 96 remain constant. When the illustrated apparatus is in operation the oscillators 97 and 98 drive the ends of bars 91 and 92 in a circular path as illustrated by dotted lines 104 and 105 in FIG. 13. This action causes the bars 91 and 92 to vibrate in a gyratory mode and drive the crushing jaws 95 and 96 in an orbiting path as shown by dotted lines 106 and 107. If the driving frequency is selected to be within the range of the locked-load resonant frequency then as seen in FIG. 8, particularly, the orbit 106 and 107 will be approximately circular regardless of the damping load over a very wide range of load conditions and regardless of the fact that the damping of the crushing occurs only in the horizontal component or direction while the vertical component remains essentially undamped. As an example of a suitable area of operation, the dark line between points A and B of FIGS. 7 and 8 would appear to be optimum for maximum value of threshold damping. The term threshold damping can be defined as that value of damping at a given frequency at which load stroke begins to fall significantly. Of course, suitable operation may be obtained at a frequency above locked-load resonant frequency but with an increase in sensitivity both to changes in load and slight changes in frequency. Operation below locked-load resonant frequency would make load displacement more sensitive to changes in load but less to changes in frequency, and would require an even larger oscillator.

As an embodiment, because the rock crusher has low threshold damping requirements, it can best be operated near the frequency $$\omega=\sqrt{\frac{\omega^2_{C=\infty}+\omega^2_{C=0}}{2}}$$

At this frequency, stress is essentially independent of damping, required oscillator force is reasonable, and sensitivity to slight changes in speed is still acceptable. This also ensures maximum energy storage per pound of stressed material, as well as other advantages hereinbefore mentioned.

Figure 14:
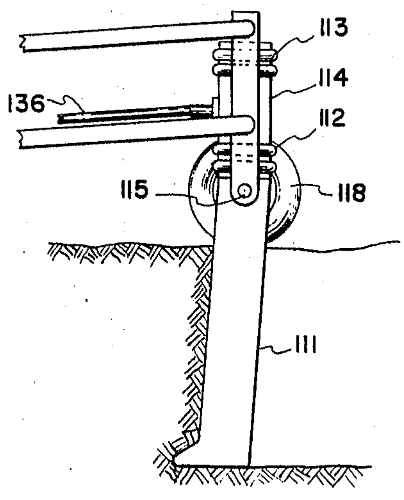
FIG. 14 is a side-elevational view of second embodiment of the present invention.
Figure 15:
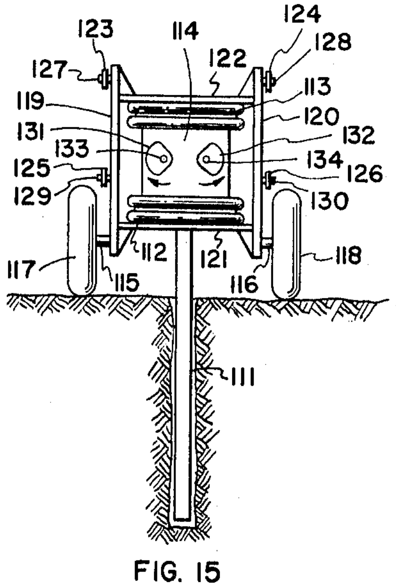
FIG. 15 is an end view of the apparatus of FIG. 14.

Referring now to FIGS. 14 and 15 there is illustrated a second embodiment of the present invention which is particularly adaptable to the constant horsepower features of the present invention. This apparatus comprises a trenching tool generally referred to as a cable plow. As illustrated, the apparatus comprises a generally vertically extending trenching member or tool 111 operatively coupled through various means including a pair of air springs 112 and 113 to an oscillator 114. The oscillator 114 may be of any suitable type such as the eccentric weight type as shown or an orbiting rotor type as shown for example in U.S. Pat. No. 3,217,551 issued Nov. 16, 1965 to Mr. A. G. Bodine, Jr. The tool member 111 is attached to a housing member which is supported by axle members 115 and 116 further connected to housing means comprising a pair of vertically extending members 119 and 120 and a pair of horizontally extending members 122 and 121 connected together to form a susbtantially rectangular frame means. The apparatus is supported from a suitable prime mover vehicle by means of a plurality of link members 123 to 126 pivotally connected by means of a plurality of pin members 127 through 130 to frame members 119 and 120. The oscillator 114 comprises a pair of eccentric masses 131 and 132 mounted on counter-rotating shafts 133 and 134 which are drivingly coupled to a drive shaft 135. A suitable propeller shaft 136 operatively couples the oscillator 114 to a suitable prime mover means not shown. This embodiment of the present invention like the previous embodiment is constructed and adapted to operate within a range preferably in the vicinity of the locked-load resonance of the system. This embodiment of the invention is particularly adaptable for a constant horsepower range of operation. This range of operation, for example, would fall somewhere in a plane or area such as that designated by the heavy line between B and C in FIGS. 7 and 8. This permits the system to operate at full maximum horsepower over a very wide range of load conditions.

Figure 16:
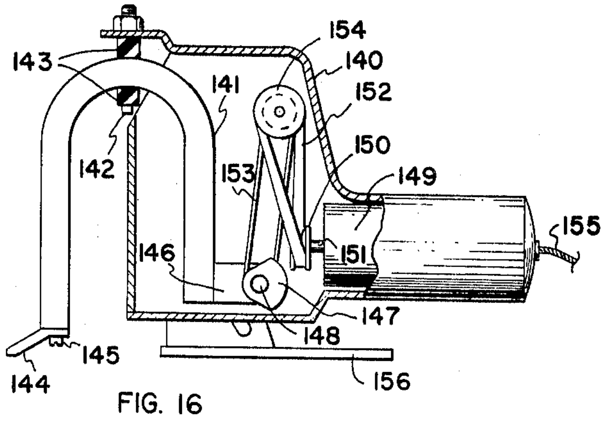
FIG. 16 is a side elevation partially in section of a further embodiment of the present invention.

Referring now to FIG. 16 there is illustrated a further embodiment of the present invention in the form of a resonant scraping apparatus. This apparatus comprises a housing member 140 on which is supported in a suitable manner an elastic U-shaped bar member 141. The bar member 141 is supported at its nodal area by suitable means such as U bolt 142 and a pair of neoprene or rubber bushings 143 clamped to housing member 140. A work tool or blade comprising a scraper blade 144 is operatively coupled such as by means of a screw 145 to the load and of the bar 141. A suitable oscillator 146 is operatively coupled to the other end of the bar 141. The oscillator 146 may be any suitable type such as an eccentric mass type as illustrated. The oscillator 146 comprises a mass 147 eccentrically mounted on rotatable shaft 148 and is driven through suitable transmission means by a suitable prime mover 149. The transmission means comprises a drive pully 150 coupled to drive shaft 151 and operatively drives first belt means 152 which drives a second belt means 153 by means of an idler pully means 154. Suitable conductor means 155 operatively connects prime mover means 149 to a suitable source of power not shown. A suitable guide plate 156 may be operatively mounted on housing member 140 in any well known manner not shown. The prime mover 49 of this system may be an induction motor operated, for example, in FIGS. 7 and 8, substantially along lines AB and from B substantially along dash line to point C. On the other hand, a less closely controlled prime mover such as a higher slip induction motor may be suitable which is permitted to operate substantially along from point A substantially along broken line to point E. In this case, while the shape of the curves is as shown, the vertical scale of values of power and stroke would be smaller for the scraper.

Figure 17:
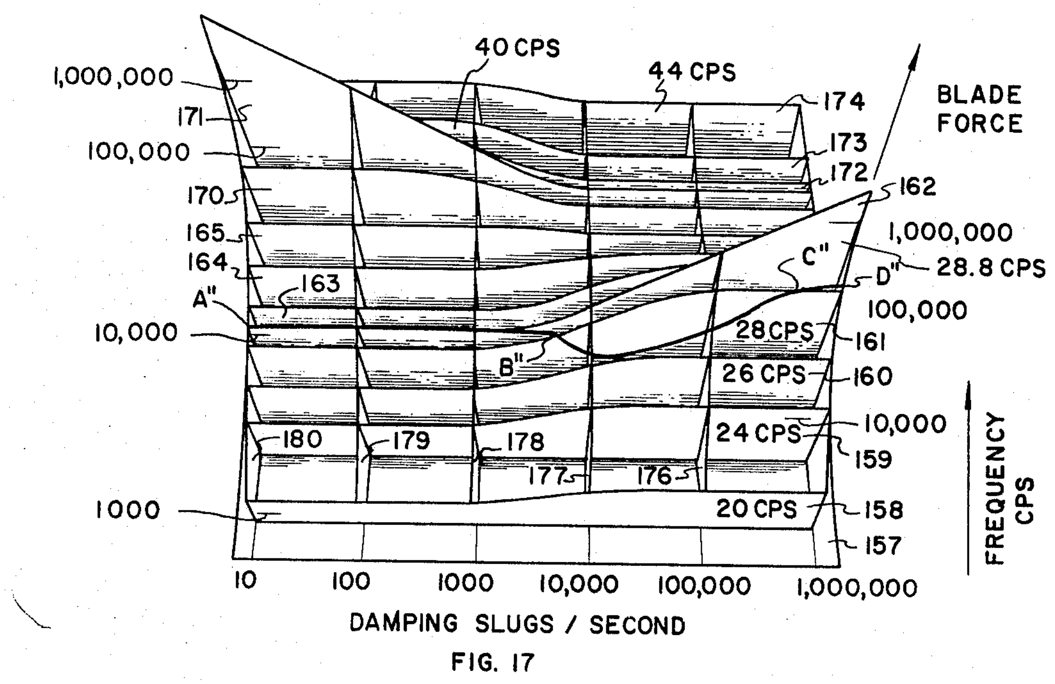
FIG. 17 is a three dimensional diagram of the relationship between important parameters of a system of the present invention not covered in prior diagrams.

The constant force or stress feature of the present invention is best illustrated with reference to FIGS. 17 and 18. Referring first to FIG. 17, there is illustrated a three-dimensional model representing the response of load force or system stress to combinations of frequency and damping for the same system represented by FIG. 7. The model of FIG. 17 comprises a base grid 157 representing load as damping in slugs per second on a log scale from left to right and representing frequency in cycles per second on a linear scale from the front to the rear background. A plurality of planar elements 158 to 172 extend upward from base grid 157 at designated frequencies. The upper or top edge of each of these planar elements represent various values of system spring stress on a log scale for the various values of load damping for the designated frequencies. A second set of planar elements 175 thru 180 are positioned at right angles to the above mentioned planar elements and extend up from base grid 157 at the designated values of load damping. The upper edges of each of these planar elements represent spring or elastic stress of the system on a log scale at various frequencies at the designated damping load. The most noteable planar elements of this model are elements 162 and 171 which represent locked resonant frequency and undamped resonant frequency ssytem which is dramatically illustrated by this model is represented by the upper edge of elements 164 and 165 which indicates that at an operating frequency in this frequency range between locked load resonant frequency and undamped resonant frequency, the load force of the system remains constant regardless of the damping load on the system. This frequency is found to be the root mean square of the locked-load and undamped resonant frequencies of the system. This constant force feature is further illustrated by the curves of FIG. 18.

Figure 18:
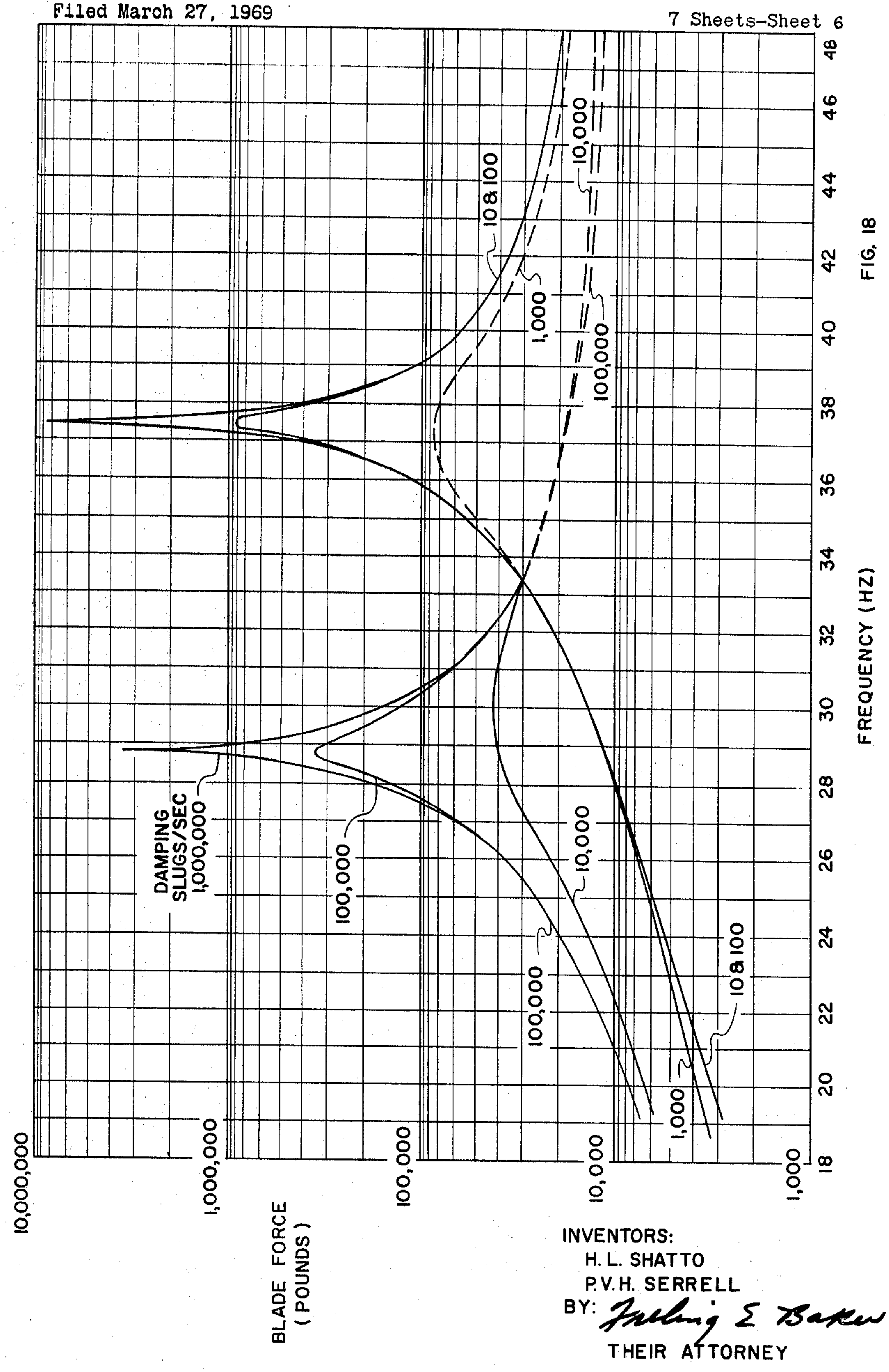
FIG. 18 is a graph of curves illustrating the relationship between important parameters of a system of the present invention.

Referring now to FIG. 18, there is illustrated a plurality of curves representing the blade or load force response of a load-opposite system at various frequencies for a given value of load damping. Each curve, for example, is labeled for the value of damping a slugs-per-second that it represents. Note that all curves go through a point falling somewhere between 33 and 34 Hz. on the illustrated scale. This is the point of constant force on the work tool or blade. A constant work force would also mean a constant force or stress in the spring or elastic member of the system. Thus, this discovery permits the construction of a resonant system which will have a constant force output regardless of damping of the load. Another important result obtainable from a system with this characteristic is that in a distributed mass system, a resonant member may be designed to its maximum permissable stress with the assurance that it will operate there regardless of load so long as design frequency is held. This permits the maximum efficient use of the resonant member. Satisfactorily constant stress may be obtained by design frequency variation from root mean square frequency of as much as 20% of the difference between locked-load and undamped resonant frequencies for wide ranges of load damping and may even be as much as 40% for narrow ranges of load damping.

Figure 19:
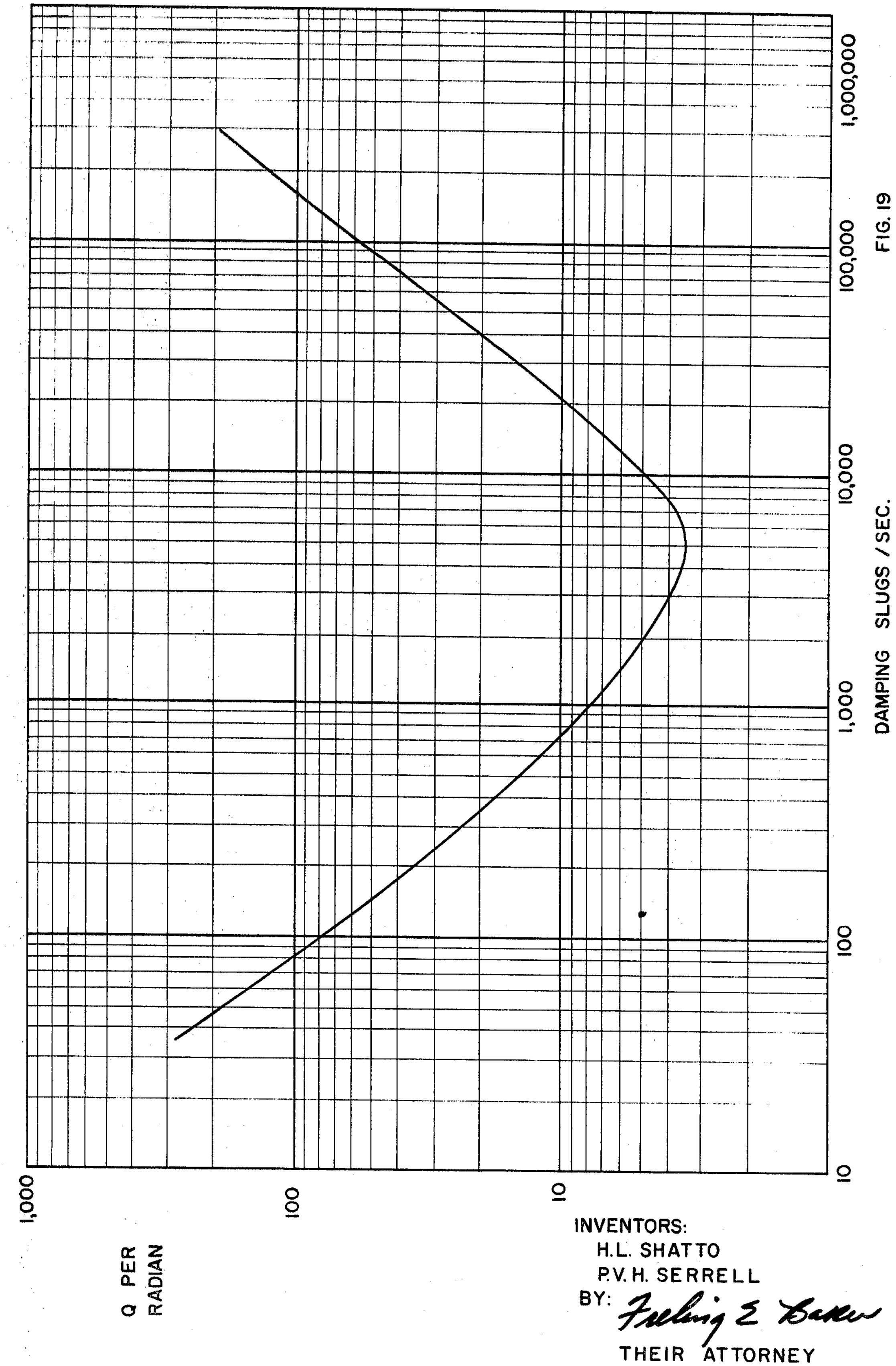
FIG. 19 is a plot of a curve illustrating an important characteristic of the present invention.

Referring now to FIG. 19, there is illustrated a further important quality of the systems of the present invention. The illustrated curve is a plot of Q per radian against load damping for a "load-opposite" resonant system operated at its locked-load resonant frequency. Q is a term well known to those of skill in the art of acoustics and generally means sharpness of resonance. As the curve in FIG. 19 illustrates, the system undergoes an initial drop in Q as damping is increased, reaches a minimum and rises again beyond a nominal value depending on the parameters of the system.

From the foregoing description it is apparent that there has been disclosed a load-opposite resonant vibratory work system having its elements constructed and arranged such that its operating frequency is in the region of its locked-load resonant frequency, and provided with a prime mover having its frequency and power matched to operate this system within this frequency range. The disclosed system is capable of providing substantially constant work stroke, constant work-force, or constant horsepower, substantially independent of the load conditions.

I claim as my invention:

1. A method of constructing a load-opposite resonant work performing system, said method comprising the steps of:

positioning a narrowly controlled prime mover of appropriate power to meet load requirements in operative driving engagement with said system.

adjusting the combinations of load stroke, frequency and damping so as to absorb the power available from said prime mover;

constructing a spring and mass combination with the above parameters that produces an operating frequency range that is determined as a function of the locked-load resonant frequency of said system where said locked-load resonant frequency is equal to $$\frac{K}{M_R+M_R}$$

providing an oscillator having mass-moment appropriate to produce the required system driving forces at the required frequency range;

operatively coupling said oscillator to said spring and mass combination such that a nodal area exists in said spring between said oscillator and the application of a load to said system; and, operatively coupling said prime mover to said oscillator to operate said system in said desired operating frequency range under an anticipated range of load conditions.

2. The method of claim 1 wherein:

said oscillator is constructed to satisfy the following equation:

$$V_L=\frac{-jM_R\rho\omega}{M_R+M_B}$$

3. The method of claim 1 wherein the operating frequency is selected to lie in the region of the root mean square of the locked-load and the undamped resonant frequencies of the system, to thereby produce substantially constant stress in said spring substantially independent of load damping.

4. The method of claim 1 wherein the operating frequency is selected to lie in the region of locked-load resonance to thereby produce substantially constant load stroke independent of load damping.

5. The method of claim 1 in which essentially constant load stroke is achieved by limiting the operating range of load damping to a value less than the threshold damping for the operating frequency and holding said operating frequency essentially constant.

6. The method of claim 5 wherein the operating frequency lies in the region of the root mean square of the locked-load resonant frequency and undamped resonant frequency of the system.

7. The method of claim 1 wherein a system is provided to operate at essentially constant horsepower of the prime mover over a wide range of damping conditions by the steps of: choosing the system parameters for the operating range of the system essentially at and just below locked-load resonant frequency; and, choosing the prime mover speed control to have a speed droop with increased torque.

8. The method of claim 7 in which prime mover speed is adjusted and regulated to approximately locked load resonant frequency at loads less than full prime mover power so that essentially constant load stroke will be achieved at all values of damping up to full power, and essentialy constant power will be achieved for higher values of damping.

9. The method of claim 7 in which prime mover speed is adjusted and regulated to approximately the root mean square of locked-load and undamped resonant frequencies for values of damping below essentially full prime mover power so that essentially constant elastic element stress will be achieved up to full power, and essentially constant power will be achieved for higher values of damping.

References Cited

UNITED STATES PATENTS

| | | | |
|---|---|---|---|
| 2,636,719 | 4/1953 | O'Connor | 74—61 |
| 3,095,747 | 7/1963 | Morris | 74—87X |
| 3,238,798 | 3/1966 | Yeasting | 44—87 |
| 3,362,485 | 1/1968 | Dyer, Sr. | 74—874 |
| 3,387,499 | 6/1968 | Bruderlein | 74—874X |
| 3,394,766 | 7/1968 | Lebelle | 175—55X |

FOREIGN PATENTS

| | | | |
|---|---|---|---|
| 579,321 | 7/1958 | Italy | 74—87 |

MILTON KAUFMAN, Primary Examiner

U.S. Cl. X.R.

74—61; 173—49; 175—55